3,071,042
SPECTACLE MOUNTING
Norman J. Radziwon, Irondequoit, and Raymond F. E. Stegeman, Greece, N.Y., assignors to Bausch & Lomb Incorporated, a corporation of New York
Filed July 5, 1960, Ser. No. 40,801
1 Claim. (Cl. 88—41)

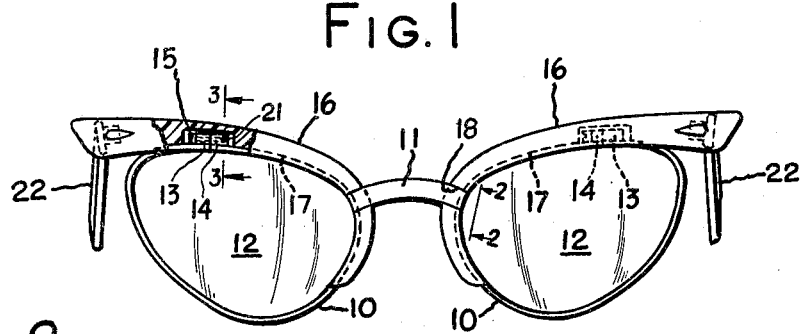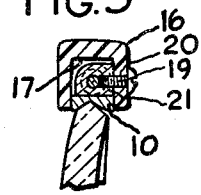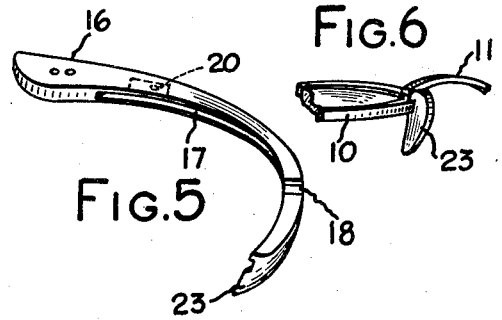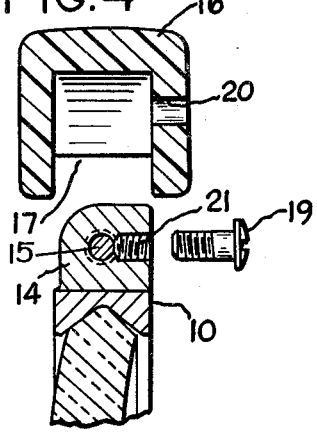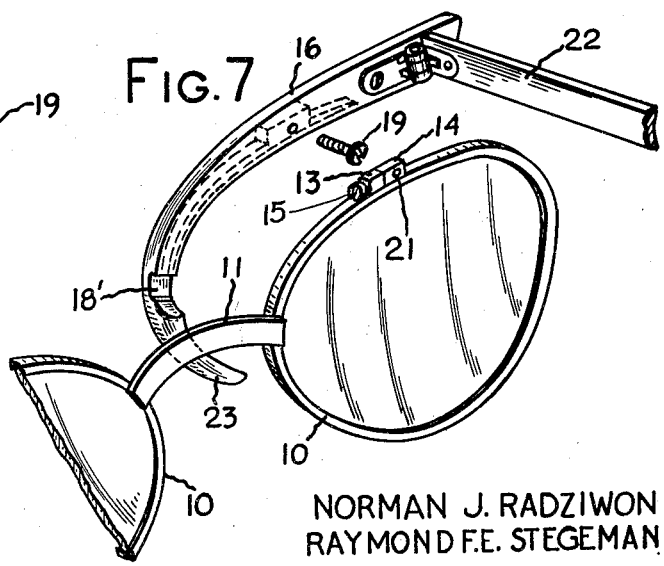
NORMAN J. RADZIWON
RAYMOND F.E. STEGEMAN
INVENTORS

United States Patent Office 3,071,042
Patented Jan. 1, 1963

The present invention relates in general to spectacle mountings and more particularly to that type of spectacle mountings comprising metallic eyewires and decorative frame members formed separately from the eyewires.

It is the principal object of the present invention to provide an improved spectacle mounting of the aforementioned general type and including decorative frame members which include integral nose pads at the nasal ends of the frame members and on which the temples are directly mounted at the other ends thereof.

A particular advantage of the present invention arises by reason of the present construction, in that, it is simpler to construct the present frames than conventional frames.

The foregoing and numerous other objects and advantages of the present invention will become apparent from the following detailed description when read in conjunction with the accompanying drawing, wherein:

FIG. 1 comprises a front elevational view of a spectacle mounting constructed in accordance with the principles of the present invention;

FIG. 2 comprises a detailed sectional view taken substantially along the line 2—2 in FIG. 1 and looking in the direction of the arrows;

FIG. 3 comprises a detailed sectional view taken substantially along the line 3—3 in FIG. 1 and looking in the direction of the arrows;

FIG. 4 comprises an exploded sectional view similar to FIG. 3;

FIG. 5 is a perspective view of one of the frame members disclosed in the embodiment of the invention shown in FIG. 1;

FIG. 6 is a detailed fragmentary view showing the nose pad of the frame member of FIG. 5; and FIG. 7 is a fragmentary exploded perspective view of a second embodiment of the invention.

Turning now to the drawing wherein like reference numerals have been used in the different views to identify identical parts, and turning to the first embodiment of the invention, the spectacle construction comprises a pair of eyewires 10 which are interconnected by means of a metal bridge 11 welded or soldered to one side of the eyewires 10. The eyewires 10 respectively enclose a pair of lenses 12 and are formed with a pair of end lugs 13 and 14 which are held together by means of a connecting screw 15 in order to tighten the eyewires around the respective lenses 12.

A pair of decorative frame members 16 are respectively disposed along the nasal and top portions of the eyewires 10, being formed with an inner groove 17 therein for the purpose of receiving eyewires 10. Each of the frame members 16 is also formed with a notch 18 in the front face thereof for receiving the end of the bridge 11. The frame members 16 are disposed with the eyewires 10 received within grooves 17 and a single connecting screw 19 is inserted through a hole 20 in the back of the frame members 16 and into a hole 21 formed in the lug 14 formed on the respective eyewires 10. The connecting screw 19 is effective to retain the frame members 16 and eyewires 10 in assembly with each other. A pair of temples 22 are hinged at the respective ends of the frame members 16 as is conventional.

Each of the frame members 16 is formed with an inwardly extending projection 23 forming a nose pad integral with the frame members. These nose pads have been found to be very comfortable for a person wearing the spectacle frames.

Turning now to FIG. 7, this embodiment of the invention is substantially like the embodiment shown in FIG. 1 with the following exceptions. In this embodiment, the bridge member 11 is secured to the rear face of the eyewires 10 and the frame members 16 are cut out to form a notch 18' on the rear face thereof for accommodating the bridge 11. The frame members 16 in the embodiment of the invention shown in FIG. 7 are likewise formed with nose pads 23 and are connected to the eyewires 10 by means of connecting screws 19 which extend into threaded openings 21 formed in the lug 14 on each eyewire.

It is contemplated that changes and modifications may be made in the present invention without departing from the spirit or scope thereof.

What is claimed is:

A spectacle mounting comprising a pair of spaced lens encircling eyewires having connecting lugs at either end and disposed at the top of the eyewires for respectively tightening the eyewires around a pair of lenses, a bridge integrally connected with each of said eyewires, a pair of frame members extending only along the top and nasal portions of said eyewires and each formed with a notch in one face thereof for receiving the end of the bridge connected with the associated eyewire, each of said frame members including an integral stiff nose pad at the nasal end thereof and being secured to the respective eyewires, a pair of opposed locating shoulders defining a continuous recess which is formed in the inner face of said frame members at least in the region of said nose pad so as to receive and embrace the adjacent parts of said eyewires, a mounting screw extending through an opening formed in each of said frame members and into holding engagement with one of the eyewire connecting lugs, and temples respectively hingedly carried at the temporal end of the frame members.

References Cited in the file of this patent
UNITED STATES PATENTS

| | | |
|---|---|---|
| 2,682,199 | Weissman | June 29, 1954 |
| 2,703,036 | Splaine | Mar. 1, 1955 |
| 2,887,008 | Gross | May 19, 1959 |
| 2,991,694 | Whipple | July 11, 1961 |

FOREIGN PATENTS

| | | |
|---|---|---|
| 812,880 | Great Britain | May 6, 1959 |
| 820,331 | Great Britain | Sept. 16, 1959 |